(12) United States Patent
Waarts

(10) Patent No.: US 6,483,974 B1
(45) Date of Patent: Nov. 19, 2002

(54) OPTICAL FIBER WITH IMPROVED CROSS-SECTIONAL PROFILE AND OPTICAL GAIN MEDIA USING SAME

(75) Inventor: Robert G. Waarts, Fremont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 26 days.

(21) Appl. No.: 09/695,559

(22) Filed: Oct. 24, 2000

(51) Int. Cl.[7] .............................. G02B 6/16; G02B 6/18; G02B 6/22
(52) U.S. Cl. ........................ 385/123; 385/124; 385/126; 385/127
(58) Field of Search ................................. 385/123, 126, 385/131, 124, 125, 127; 359/341.4, 337, 115, 124, 341.3; 372/6

(56) References Cited

U.S. PATENT DOCUMENTS

| | | | | |
|---|---|---|---|---|
| 4,859,016 A | * | 8/1989 | Shaw et al. ..................... | 385/5 |
| 5,309,452 A | * | 5/1994 | Ohishi et al. ................ | 385/142 |
| 5,363,463 A | * | 11/1994 | Kleinerman ................. | 385/123 |
| 5,469,292 A | * | 11/1995 | Bjarklev et al. ............ | 359/341 |
| 5,877,890 A | * | 3/1999 | Snitzer ........................ | 359/341 |
| 6,236,793 B1 | * | 5/2001 | Lawerence et al. ......... | 385/132 |

* cited by examiner

*Primary Examiner*—Georgia Epps
*Assistant Examiner*—Omar Hindi
(74) *Attorney, Agent, or Firm*—Kudirka & Jobse, LLP

(57) ABSTRACT

An optical fiber gain medium has a core region in which a signal propagates, and a cladding region surrounding the core into which a pump signal is coupled. The gain medium also includes a plurality of doped regions each of which has a different effect on the gain profile of the gain medium. In a first embodiment, two doped regions are located in the cladding region at different radial distances from the core. Each of the two doped regions has a different absorption characteristic such that it absorbs signal energy in a different wavelength region of the gain band. The relative contributions may be controlled by controlling a number of different factors, including type of dopant, density of dopant, radial width of the doped regions, and relative separation between the doped regions, and their positioning relative to evanescent portions of different wavelength bands. In another embodiment, the different doped regions include dopant in the core and in a cladding region, and each dopant is pumped by a separate pump source. The relative contributions of the different dopants to the gain in the different wavelength ranges may be controlled by type of dopants used, density of doping, location of the dopant region in the cladding relative to the core and evanescent portions of different wavelength bands, and relative pump power and pump wavelengths provided to each doped region.

42 Claims, 3 Drawing Sheets

OPTICAL FIBER WITH IMPROVED CROSS-SECTIONAL PROFILE AND OPTICAL GAIN MEDIA USING SAME

FIELD OF THE INVENTION

This invention relates generally to the field of optical fiber design and, more specifically, to optical fiber with a cross-sectional profile for use with optical fiber gain or loss media having improved gain or loss characteristics.

BACKGROUND OF THE INVENTION

An optical fiber gain medium is a device that increases the amplitude of an input optical signal. If the optical signal at the input to such an amplifier is monochromatic, the output will also be monochromatic, with the same frequency. A conventional fiber amplifier comprises a gain medium, such as a glass fiber core doped with an active material, into which is coupled to an input signal. Excitation occurs from the absorption of optical pumping energy by the core. The optical pumping energy is within the absorption band of the active material in the core, and when the optical signal propagates through the core, the absorbed pump energy causes amplification of the signal transmitted through the fiber core by stimulated emission. Optical amplifiers are typically used in a variety of applications including but not limited to amplification of optical signals such as those that have traveled through a long length of optical fiber in optical communication systems.

Many different types of optical fiber have been developed over the years to improve the characteristics of fiber gain media. Different characteristics of the fiber can significantly affect the various characteristics of concern. For example, doping with different active materials produces different wavelength profiles for both absorption of pump energy and gain. In a silica-based fiber, doping with erbium produces an absorption spectrum, for example, in the ranges of 980 nm and 1480 nm, and an emission spectrum, for example, in the range of 1550 nm. However, co-doping with erbium and ytterbium produces a gain medium that, due to the charge transfer between the ytterbium and the erbium, produces an absorption spectrum that includes light in the vicinity of 1060 nm, while still maintaining an emission spectrum in the vicinity of 1550 nm.

Since signal propagation is in the core of a fiber, doping of the fiber with an active material is typically in the core. Pump light is therefore often coupled into the core as well. In some multiple-clad fibers, however, signal propagation is in the doped fiber core, while pump light is injected into an inner pump cladding of the fiber that surrounds the core. It is still the core that is the portion of the fiber doped with active material. However, the pump light traveling through the inner cladding tends to intersect the core, getting absorbed by the active material. This produces the desired gain in the core.

Recently, fiber has been described that has a core doped with active material, but that also has a cylindrical ring separated from and encompassing the core that is also doped with an active material. An example of such an arrangement is shown in U.S. Pat. No. 5,970,198, in which a fiber has a core doped with a first combination of materials, and a ring region spaced radially from the core and doped with a different combination of materials. As such, the two doped regions produce different gain responses when pumped. The core of the fiber is pumped with pump energy at two different wavelengths, a first, shorter wavelength (i.e., 0.98 $\mu$m) and a second, longer wavelength (i.e., 1.48 $\mu$m). Because of their different wavelengths, each of the pump signals has a different mode field diameter. That is, each pump signal has a different distribution of power density over the cross-sectional area of the fiber. The portion of the light that extends beyond the core boundary is generally referred to as the "evanescent" portion. The longer wavelength pump signal has a much larger evanescent portion, and therefore a much greater interaction with the dopant in the ring region. Therefore, adjusting the relative power of the two pump signals allows the overall gain profile of the gain medium to be adjusted.

SUMMARY OF THE INVENTION

In accordance with the present invention, an optical fiber gain medium is provided that has a core region within which an optical signal propagates, and a cladding region surrounding the core region. The cladding region has a lower index of refraction than the core region, and may be appropriate for receiving pump energy that pumps an active material in the gain medium so as to provide signal gain to the optical signal in the core. The fiber gain medium also has a plurality of doped regions within the fiber that influence the gain profile of the gain medium.

In a first embodiment of the invention, first and second doped regions are located within the cladding region of the fiber. Each of the doped regions has a different radial distance from the core, and each has a different dopant composition. Each of the dopant compositions results in an absorption loss to the optical signal in the core, as an evanescent portion of the signal overlaps and interacts with each of the doped regions. In this embodiment, the absorption loss attributable to interaction with the first doped region affects a different wavelength range than that attributable to the second doped region.

Different mechanisms may be used to effect the degree to which different wavelengths in the signal are absorbed by the doped region. For example, the different radial positions of the rings may be used to provide different degrees of signal absorption at different wavelengths, since the different wavelengths will have different relative degrees of evanescent spreading into the cladding region. The materials used to dope the doped regions may themselves be selected to create a desired absorption profile, either in and of themselves, or in combination with the radial positioning of the doped regions. The density of the dopant distribution in each doped region may also be selected to control the relative effect of each. Moreover, the radial width of the doped regions can also be used to control the relative absorption in different wavelengths of the optical signal, and may be combined with other methods of doing so.

In another embodiment of the invention, the fiber has a core region and a cladding region, and multiple doped regions include a doped region in the core and a doped region in the cladding. Each of the doped regions includes an active material that, when pumped with pump energy at an appropriate pump wavelength, provides gain to the optical signal in the core within a desired wavelength range. Also provided in this embodiment are a first pump source coupling a first pump signal into the core, and a second pump source coupling a second pump signal into the cladding region. Independent control of the first pump source and the second pump source allow the relative gain contributions of the two doped regions to be actively controlled. The radial distance of the doped cladding region from the core may be selected to provide desired relative contributions from the two doped regions. The width of the doped cladding region may also be selected to affect the relative contributions of the doped core region and the doped cladding region to the signal gain. Similarly, the relative density of the dopant in the cladding region and the dopant in the core may likewise be used to control the relative gain contributions from the two regions. Also, the particular dopant material for either or both of the doped regions may be selected so as to provide significantly more gain to one wavelength range within the signal gain band than to other wavelengths within the gain band. Any of these different methods may be mixed and matched to provide a desired gain profile for the gain medium.

BRIEF DESCRIPTION OF THE DRAWINGS

The above and further advantages of the invention may be better understood by referring to the following description in conjunction with the accompanying drawings in which.

DETAILED DESCRIPTION

Figure 1:
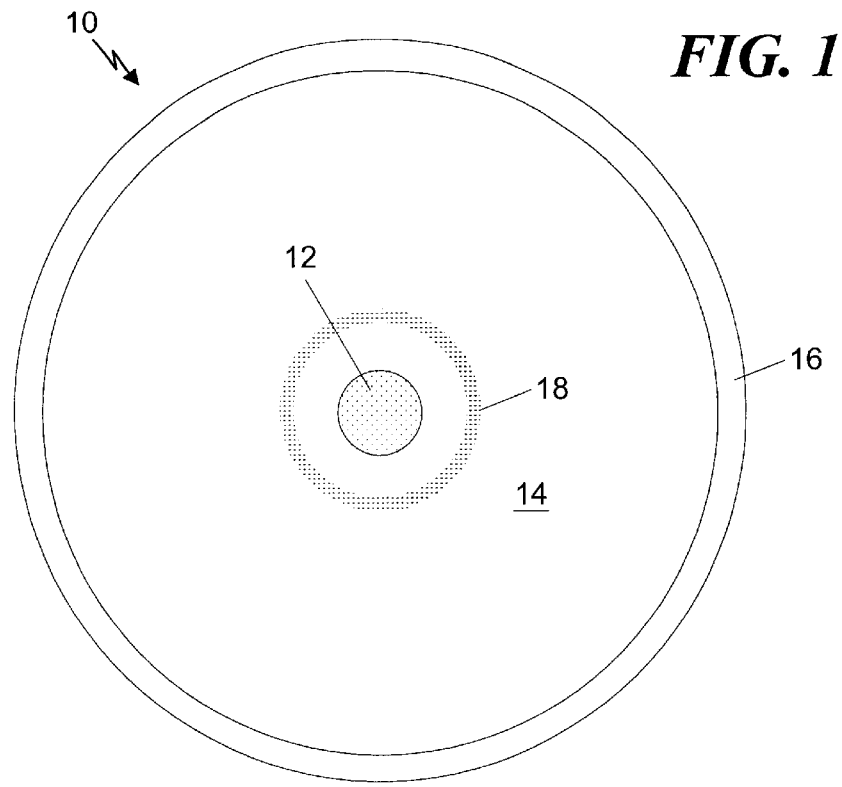
FIG. 1 is a schematic cross-sectional view of an optical fiber configured according to the present invention.

Shown in FIG. 1 is a cross sectional view of a double clad optical fiber 10 according to a first embodiment of the invention. The fiber 10 consists of three distinct radial sections of different refractive index. At the center of the fiber is a core region 12, which serves as the signal propagation region of the fiber. Surrounding the core is an inner cladding 14, which has a lower refractive index than the core 12. The different refractive indexes of the inner cladding 14 and the core 12 form an optical boundary that maintains a total internal reflection condition for a signal propagating in the core, allowing the fiber to serve as a waveguide. Outside of the inner cladding 14 is an outer cladding 16 that has a lower refractive index than the inner cladding 14. This outer cladding 16 and inner cladding 14 therefore form another optical boundary due to the difference in their refractive indexes. Thus, light at a particular desired wavelength that is launched into the inner cladding does not exit into the outer cladding. However, since such light tends to be reflected around within the inner cladding, it may encounter the core 12, into which it crosses due to the higher refractive index of the core material. Those skilled in the art will recognize that FIG. 1 is not necessarily to scale, and that the size of the core relative to the cladding region may, in fact, be much smaller.

The fiber shown in FIG. 1 has a construction that is advantageous for use in an optical fiber laser or amplifier. The core 12 may be doped with an active material that absorbs optical energy in a certain wavelength range. In response to such absorption (or "pumping"), the active material undergoes atomic state changes that result in the generation of optical energy at a desired signal wavelength. Thus, pumping the doped core at an appropriate wavelength causes the desired optical gain at the signal wavelength. In the configuration of FIG. 1, because of the tendency of optical energy in the inner cladding 14 to intersect the core 12, pump energy may be launched into the inner cladding 14 so that it is eventually absorbed by the active material in the core 12. The larger diametrical space in the inner cladding 14 allows for a greater amount of pump energy to be coupled into the fiber than in the case where it was coupled only into the core 12. As such, the output power of the gain medium is higher than it would otherwise be.

In the embodiment of FIG. 1, the core 12 of the fiber is doped with an active material. However, a ring 18 of dopant is also provided in the inner cladding 14, a selected distance from the core 12. This distance is selected so that evanescent overlap of the pump light in the core has a certain amount of interaction with the active material in the ring 18. In addition, in this embodiment pump light is also provided to the inner cladding 14 itself. Thus, signal gain in the core is provided by interaction between the pump light launched into the core and the dopant in the core, as well as by interaction between pump light confined in the core and the dopant in the ring 18. Moreover, signal gain is also provided as the active dopant in the ring 18 absorbs pump energy launched in the inner cladding 14, and produces optical energy that is coupled to the optical signal propagating in the core, the mode field diameter of which overlaps with the ring 18.

An advantageous feature of the embodiment of FIG. 1 is its use in providing signal gain in two different gain bands. In many amplifier applications, for example, it is desirable to provide gain across a gain bandwidth that is wider than that provided when a single dopant material is used. Use of a second dopant material can provide signal gain in a second gain band that overlaps with a gain band provided by the first dopant material. Such overlapping gain bands can be used to form a single gain band broader than either of the individual gain bands, thereby allowing amplification of a signal over a broader wavelength range.

In a preferred embodiment, the dopant in the core 12 in FIG. 1 is different than the dopant in the ring 18, and the gain bandwidth of each dopant overlaps with that of the other. This provides an overall broader gain profile for signal amplification but, since the dopants are located in separate regions, it also allows a certain degree of control over how much gain is provided in each of the two gain bands. This relative gain is also affected by the different absorption profiles of the dopants, which cause them to react differently to the presence of certain pump wavelengths. Moreover, the separation of the ring 18 from the core is determined such that certain signal wavelengths within the core have more interaction with the ring than others due to the varying degrees of evanescent spreading or different mode field diameters of the different signal wavelengths.

Figure 2:
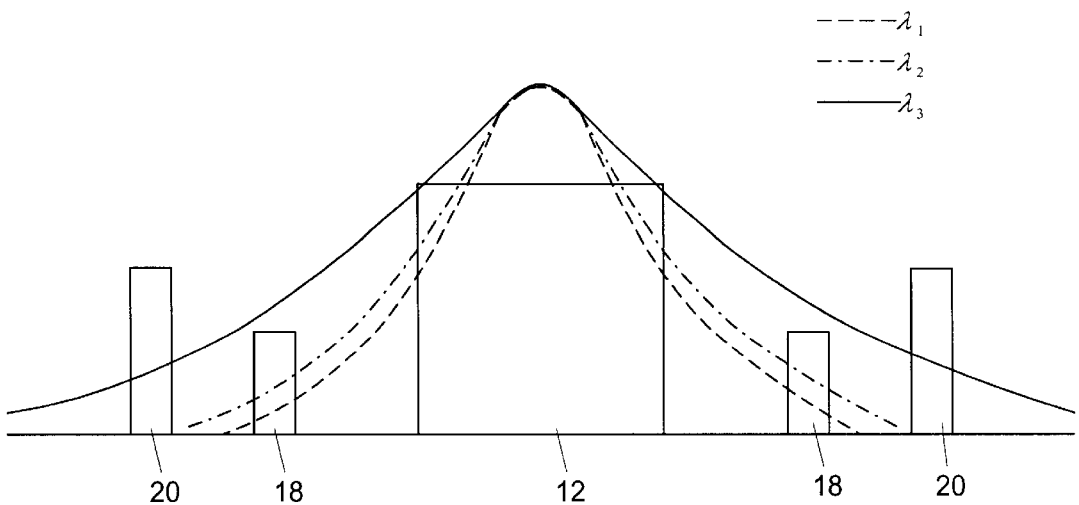
FIG. 2 is a graphical depiction of various regions along the radial dimension of a fiber according the present invention, and the relative overlap with a doping profile of evanescent portions of various signal mode field diameters in the fiber core at different wavelengths.

The relative control over the gain band of an amplifier according to the present invention is further shown in the embodiment of FIG. 2. This embodiment is similar to that of FIG. 1 but, in addition to the doped core, two dopant rings are used instead of just one. The two rings 18, 20 are located at different radial distances from the core and have different dopant concentration profiles. In the figure, these rings are shown in graphical form along a horizontal axis indicative of fiber diameter. Also shown in the figure is a graphical depiction of how the evanescent portions of each of several different wavelengths in the core ($\lambda_1$, $\lambda_2$ and $\lambda_3$) tend to overlap with each of the fiber rings 18, 20.

An example of how such a fiber design may be used to control the gain profile of a gain medium is described below in conjunction with FIG. 2. In this example, $\lambda_3$ is the longest of the three wavelengths, and $\lambda_1$ is the shortest, with $\lambda_2$ being in between. As shown, the light at $\lambda_3$ has an evanescent portion that extends well beyond that of either $\lambda_2$ or $\lambda_1$. The rings, 18, 20, are located in the cladding portion of the fiber relative to these evanescent contributions, and are doped to provide the desired results. In this example, it is desirable to provide a high degree of gain at wavelength $\lambda_2$, but a minimal gain at $\lambda_1$ and $\lambda_3$. The doping rings are therefore provided with materials, e.g., ytterbium, erbium, neodymium or combinations thereof, that are absorbent at different wavelengths. In particular, ring 18 has a dopant that is absorbent at wavelengths of $\lambda_1$ or shorter, while ring 20 has a material that is absorbent at wavelengths of $\lambda_3$ or longer. The strength of the absorption in each ring is controlled by the dopant density in that ring and the amount of evanescent overlap.

Figure 3:
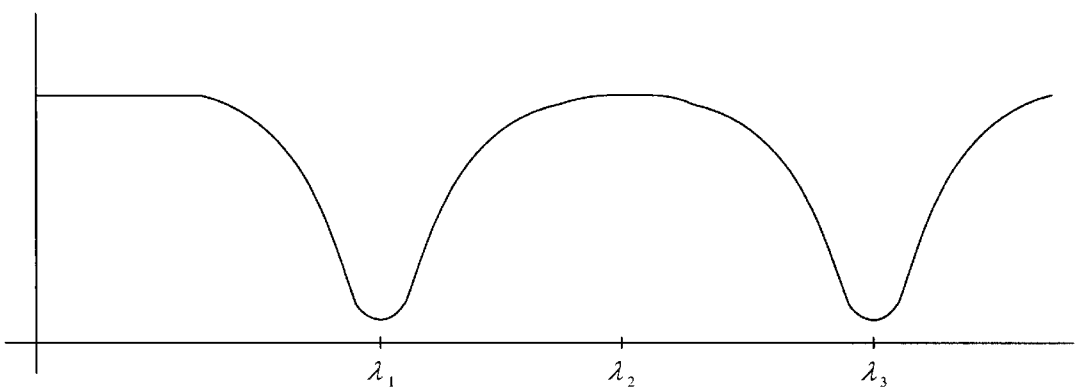
FIG. 3 is a graphical depiction of the wavelength response of a signal propagating in the core of a fiber such as that shown in FIG. 2.

As shown in FIG. 2, the evanescent portion of the light at $\lambda_1$ overlaps only with ring 18. The absorption characteristic of this ring creates a significant attenuation at that wavelength and, as a result, there is minimal gain at $\lambda_1$. The evanescent portions of the light in the core at $\lambda_2$ and $\lambda_3$ also overlap with ring 18 but, because of the absorption characteristic of the dopant, these wavelengths are too long to be seriously attenuated by the dopant of this ring. However, the evanescent portion of the light at $\lambda_3$ also overlaps ring 20. Since there is dopant material in this ring that absorbs light at $\lambda_3$, a significant attenuation of the light in the core 12 occurs at this wavelength. However, even if the dopant material of ring 20 is absorbent at $\lambda_2$, there is no significant attenuation of light in the core at $\lambda_2$ since the evanescent portion of this light does not overlap with ring 20. Thus, an amplifier constructed using a fiber having the configuration of FIG. 2 will have a gain profile like that shown in FIG. 3, with gain minimums at $\lambda_1$ and $\lambda_3$.

It will be apparent to those skilled in the art that many different gain profile designs may be constructed using the principles of the foregoing embodiment. By providing dopants having particular wavelength characteristics and rings having a particular radial separation relative to the fiber core appropriate to provide the desired overlap with the evanescent portions of wavelengths in the core, the desired results can be achieved. Examples of applications that may use a fiber configuration such as that shown in FIG. 2 include a gain flattening filter, a Raman amplifier with a correction for the Raman gain tilt, and other applications that require a spectral shaping of light propagating in a single mode fiber.

In a variation of the above embodiment, additional dopants are added to the rings to compensate for the effect that the absorption dopants have on the index profile of the fiber. For example, fluorine may be added to the rings to provide such compensation, and help keep the index profile separate from the loss profile. Such dopants may also be added between the rings, or between the inner ring and the core.

Figure 4A:
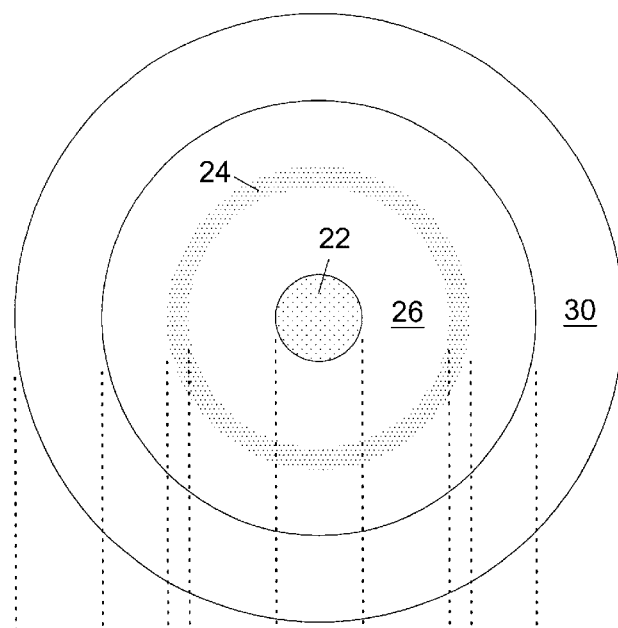
FIG. 4A is a schematic cross-sectional view of an optical fiber according to the present invention.
Figure 4B:
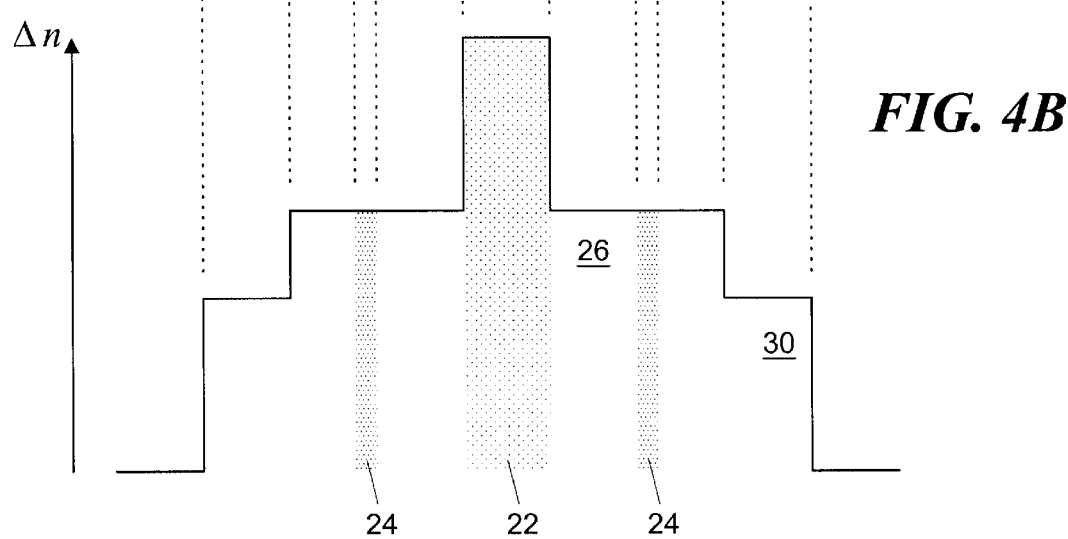
FIG. 4B is a graphical depiction of an index profile and doping profile of the optical fiber of FIG. 4A.

In another embodiment of the invention, multiple rings are used, but each ring has dopant material that serves to provide signal gain at certain wavelengths, rather than attenuate certain wavelengths. For example, in optical fiber amplifiers, it is often desirable to provide gain in both the "C" and the "L" bands, which are generally considered to encompass the wavelength ranges of 1530 nm–1565 nm and 1570 nm–1610 nm, respectively. A configuration as shown in FIGS. 4A and 4B provides such a response. FIG. 4B is similar to FIG. 2 in that its horizontal dimension is representative of different radial positions in a cross section of the fiber. However, this figure also shows, along the vertical axis (labeled $\Delta n$ to indicated relative change in refractive index), the different refractive indexes of the different portions of the fiber. The doped regions of the fiber are shown in different degrees of shading. FIG. 4A depicts a cross section of the fiber itself, and the different sections of the fiber in FIG. 4A are correlated to the different regions of the graphical depiction in FIG. 4B by dotted lines.

As shown in FIG. 4A, the core 22 of the fiber has the highest refractive index, and is doped with a first active material, preferably a rare earth dopant such as erbium. Thus, optical pump energy in the core 22 at the appropriate wavelength is absorbed by the active material, and produces signal gain in the form of optical energy at the wavelength of a desired signal traveling in the core. Spaced a predetermined radial distance outward from the core is a ring 24 of dopant material. The dopant ring 24 is positioned in a second region 26 of the fiber, which has a lower refractive index than that of the core 22. This second region 26 may be the inner cladding of the fiber, and the refractive index boundary between the inner cladding and the core 22 serves to maintain optical energy within the core. A third region 30, typically an outer cladding portion of the fiber, has a refractive index lower than that of the inner cladding 26, and therefore serves to keep optical energy propagating within the inner cladding.

In the preferred embodiment, the dopant ring 24 is located so that the evanescent portion of the signal energy in the core overlaps with it to a certain degree. Two separate pump sources are used, one that injects pump energy into the core of the fiber, and one that injects pump energy into the inner cladding 26. The pump energy in the core serves to pump only the dopant in the core. However, the pump energy in the cladding activates or energizes both the cladding dopant and the dopant in the core, as it tends to intersect the core to a certain degree as it propagates through the inner cladding. Thus, the signal acquires gain from both the pumping of the core dopant and the cladding dopant. However, in this embodiment, the two dopant materials differ from each other, and provide signal gain in different gain bands. For example, if the core is doped with erbium, and the pump energy coupled into the core has a wavelength of 980 nm, this will produce signal gain in the C-band. If the dopant of ring 24 includes a combination of erbium and ytterbium, and the pump energy coupled into the inner cladding has a wavelength in the range of 915 nm–1100 nm, this will produce signal gain in the core in the L-band.

With a configuration as described above, the overall gain bandwidth can be spread over both the C-band and the L-band. Moreover, the relative shape of the gain bandwidth can be actively controlled by controlling the amount of pump energy coupled into each portion of the fiber. For example, if it is desirable to increase the amount of gain in the longer wavelengths of the gain bandwidth, the intensity of the pump source coupled into the inner cladding region 26 can be increased. This active control allows the user to modify the shape of the gain bandwidth during operation. Of course, the initial shape of the gain band may be determined by a number of different parameters of the fiber. For example, the gain contribution from the dopant ring 24 will be greater if the dopant concentration in the ring 24 is greater, if the ring itself is wider, or if it is positioned closer to the core. The dopant concentration in the core will also affect the relative gain contributions as well. Those skilled in the art will recognize that different combinations of these parameters will yield different results, any of which allows a user to define the desired gain parameters for a particular application.

Figure 5:
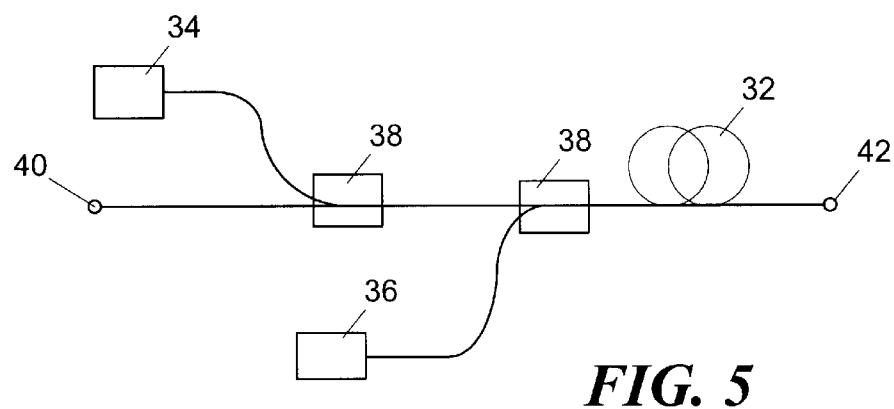
FIG. 5 is a graphical depiction of a pumping arrangement for use with a gain medium such as that of FIGS. 4A and 4B.

Shown in FIG. 5 is an example of an application for providing pumping energy to an amplifier using a fiber configuration as described above. Optical pumping energy is provided from each of two separate pump sources 34 and 36 to a double-clad optical amplifier fiber 32 having a fiber configuration such as that shown in FIG. 1. The pump source 34, which can be, for example, a laser diode, is coupled into the core of the fiber 32 via wavelength division multiplexer (WDM) 38. This pump source provides pump energy at a wavelength appropriate for pumping the dopant in the core of the fiber. A second pump source 36, which can also be a laser diode, is coupled into the inner cladding of the fiber via WDM 38. This pump source provides pump energy at a wavelength appropriate for pumping the dopant in the ring in the inner cladding of the fiber. By controlling the output of the two pump sources 34, 36, a signal that is input to the amplifier at input port 40 undergoes signal gain across a gain bandwidth determined by the relative contributions of the two pumped dopant regions 12, 18, and is provided as an output at output port 42.

It will be apparent to those skilled in the art that a number of different combinations and variations of the above embodiments exist that all fall within the scope of the invention as described. For example, absorbing rings may be combined with doped, gain-providing rings to create a gain profile specifically tailored for a given situation. The pump intensities, wavelengths and locations at which they are injected into the fiber may be changed as well. Dopants used within the core and in any doping rings may also be selected to accommodate an express purpose, and the concentration of the dopants in the rings may be varied or graded across the ring or rings. In addition, the dopant rings may have different widths and/or different radial distances from the core and from each other. Moreover, the index profile of the fiber may be selected so as to affect the degree of interaction between the optical energy within the core and the dopant rings outside of the core. It will be recognized by those skilled in the art that other variations in form and detail may be made herein without departing from the spirit and scope of the invention as defined by the appended claims.

What is claimed is:

1. An optical fiber for use in selectively modifying the wavelength profile of an optical signal, the fiber comprising:
    a core region within which the optical signal propagates;
    a cladding region surrounding the core region and having an index of refraction lower than that of the core region; and
    a plurality of doped regions within the cladding region, each doped region having at least one active element and a different radial distance from the core, the doped cladding regions being such that each provides the optical signal with either gain or absorption in a different wavelength band within the wavelength range of the optical signal.

2. An optical fiber according to claim 1 wherein the radial distances of the doped cladding regions from the core are such that different wavelength bands of the optical signal have evanescent portions that overlap to different extents with the plurality of doped regions within the fiber cladding.

3. An optical fiber according to claim 1 wherein the doped cladding regions that provide gain have coupled into them optical pump energy from one or more optical pump sources.

4. An optical fiber according to claim 1 wherein the core is doped with a material that provides gain in a wavelength band of the optical signal when pumped with an optical pump source.

5. An optical fiber according to claim 1 wherein the doped cladding regions comprise a plurality of cladding regions each doped with active material that interacts with an evanescent portion of the optical signal and attenuates a portion of the optical signal within a predetermined portion of the overall wavelength band of the optical signal.

6. An optical fiber according to claim 5 wherein the cladding regions that attenuate the optical signal attenuate different wavelength bands of the optical signal.

7. An optical fiber according to claim 5 wherein the cladding regions that attenuate the optical signal are doped with different active materials.

8. An optical fiber according to claim 1 wherein a variation in the refractive index of the fiber promotes a desired interaction between an evanescent portion of the optical signal and the doped cladding regions.

9. An optical fiber according to claim 1 wherein the core region is doped with an active material that provides gain or attenuation to at least a portion of the wavelength band of the optical signal.

10. An optical fiber according to claim 1 wherein a dopant density within the first cladding region changes with radial distance from the core.

11. An optical fiber comprising:
    a fiber core region within which an optical signal propagates;
    a fiber cladding region surrounding the core region and having an index of refraction lower than that of the core region; and
    first and second doped regions each located within the cladding region a different radial distance from the core and each having a different dopant composition that results in absorption loss to the optical signal, the absorption loss attributable to the first doped region affecting a different wavelength range of optical signals than that attributable to the second doped region.

12. A fiber according to claim 11 wherein the absorption loss attributable to the first doped region occurs at a first wavelength for which an evanescent portion of optical energy at the first wavelength has a significantly greater overlap with the first doped region than with the second doped region.

13. A fiber according to claim 11 wherein a dopant material of the first doped region is significantly more absorbent at wavelengths in a first wavelength range of the optical signal than at wavelengths in a second wavelength range of the optical signal.

14. A fiber according to claim 11 wherein the first doped region has a significantly greater radial width than the second doped region.

15. A fiber according to claim 11 wherein the first doped region has a significantly greater dopant concentration than the second doped region.

16. A fiber according to claim 11 wherein the first doped region has a dopant density that changes with radial distance from the core.

17. A fiber according to claim 11 wherein a variation in the refractive index of the fiber promotes a desired interaction between an evanescent portion of the optical signal and the doped cladding regions.

18. An optical gain apparatus comprising:
    an optical core region within which an optical signal propagates;
    an optical cladding region surrounding the core region and having an index of refraction lower than that of the core region;
    a first doped region within the core region with which the optical signal interacts, the first doped region comprising a first active material that produces signal gain in the core in a first wavelength range when pumped by a first pump signal;
    a second doped region within the cladding region with which the optical signal interacts, the second doped region comprising a second active material that produces signal gain in the core in a second wavelength range different than the first wavelength range when pumped by a second pump signal;

a first pump source that couples the first pump signal into the core region; and a second pump source that couples the second pump signal into the cladding region.

19. A gain apparatus according to claim 18 wherein an evanescent portion of signal wavelengths in the second wavelength range have a significantly greater degree of overlap with the second doped region than an evanescent portion of signal wavelengths in the first wavelength range.

20. A gain apparatus according to claim 18 wherein the second doped region has a dopant density that changes with radial distance from the core.

21. A gain apparatus according to claim 18 wherein a variation in the refractive index of the core region and the cladding region promotes a desired interaction between an evanescent portion of the optical signal and the doped cladding regions.

22. A method of selectively modifying the wavelength profile of an optical signal, the method comprising:

coupling the optical signal into an optical core region within which the optical signal propagates;

providing a cladding region surrounding the core region and having an index of refraction lower than that of the core region; and locating a plurality of doped regions within the fiber cladding, each doped region having at least one active element and a different radial distance from the core, the doped cladding regions being such that each provides the optical signal with either gain or absorption in a different wavelength band within the wavelength range of the optical signal.

23. A method according to claim 22 wherein the radial distances of the doped cladding regions from the core are such that different wavelength bands of the optical signal have evanescent portions that overlap to different extents with the plurality of doped regions within the fiber cladding.

24. A method according to claim 22 wherein the doped cladding regions that provide gain have coupled into them optical pump energy from one or more optical pump sources.

25. A method according to claim 24 wherein the core is doped with a material that provides gain in a wavelength band of the optical signal when pumped with an optical pump source.

26. A method according to claim 22 wherein the doped cladding regions comprise a plurality of cladding regions each doped with active material that interacts with an evanescent portion of the optical signal and attenuates a portion of the optical signal within a predetermined portion of the overall wavelength band of the optical signal.

27. A method according to claim 26 wherein the cladding regions that attenuate the optical signal attenuate different wavelength bands of the optical signal.

28. A method according to claim 26 wherein the cladding regions that attenuate the optical signal are doped with different active materials.

29. A method according to claim 22 wherein a variation in the refractive index of the optical medium promotes a desired interaction between an evanescent portion of the optical signal and the doped cladding regions.

30. A method according to claim 22 wherein the core region is doped with an active material that provides attenuation to at least a portion of the wavelength band of the optical signal.

31. A method according to claim 30 wherein a variation in the refractive index of the core region and the cladding region promotes a desired interaction between an evanescent portion of the optical signal and the doped cladding regions.

32. A method of attenuating an optical signal, the method comprising coupling the optical signal into an optical fiber that has a fiber core region within which an optical signal propagates and a fiber cladding region surrounding the core region that has an index of refraction lower than that of the core region, wherein the cladding region includes first and second doped regions each located a different radial distance from the core and each having a different dopant composition that results in absorption loss to the optical signal, the absorption loss attributable to the first doped region affecting a different wavelength range of optical signals than that attributable to the second doped region.

33. A method according to claim 32 wherein the absorption loss attributable to the first doped region occurs at a first wavelength for which an evanescent portion of optical energy at the first wavelength has a significantly greater overlap with the first doped region than with the second doped region.

34. A method according to claim 33 wherein a dopant material of the first doped region is significantly more absorbent at wavelengths in a first wavelength range of the optical signal than at wavelengths in a second wavelength range of the optical signal.

35. A method according to claim 33 wherein the first doped region has a significantly greater radial width than the second doped region.

36. A method according to claim 32 wherein the first doped region has a significantly greater dopant concentration than the second doped region.

37. A method according to claim 32 wherein the first doped region has a dopant density that changes with radial distance from the core.

38. A method according to claim 32 wherein a variation in the refractive index of the fiber promotes a desired interaction between an evanescent portion of the optical signal and the doped cladding regions.

39. A method of modifying an optical signal, the method comprising:

coupling the optical signal into an optical fiber having an optical core region within which an optical signal propagates and a fiber cladding region surrounding the core region and having an index of refraction lower than that of the core region, wherein the core region has a first doped region with which the optical signal interacts, the first doped region comprising a first active material that produces signal gain in the core in a first wavelength range when pumped by a first pump signal, and wherein the cladding region has a second doped region with which the optical signal interacts, the second doped region comprising a second active material that produces signal gain in the core in a second wavelength range different than the first wavelength range when pumped by a second pump signal;

providing the first pump signal to the first doped region; and providing the second pump signal to the cladding region.

40. A method according to claim 39 wherein an evanescent portion of signal wavelengths in the second wavelength range have a significantly greater degree of overlap with the second doped region than an evanescent portion of signal wavelengths in the first wavelength range.

41. A method according to claim 39 wherein the second doped region has a dopant density that changes with radial distance from the core.

42. A method according to claim 39 wherein a variation in the refractive index of the core region and the cladding region promotes a desired interaction between an evanescent portion of the optical signal and the doped cladding regions.

* * * * *